US012618547B1

(12) United States Patent
Ji

(10) Patent No.: US 12,618,547 B1
(45) Date of Patent: May 5, 2026

(54) PROJECTION LAMP WITH RODENT REPULSION EFFECT

(71) Applicant: Zhongshan Yong Qi Electronic Co., Ltd., Zhongshan (CN)

(72) Inventor: Shaoqi Ji, Zhongshan (CN)

(73) Assignee: ZHONGSHAN YONG QI ELECTRONIC CO., LTD., Zhongshan (CN)

( * ) Notice: Subject to any disclaimer, the term of this patent is extended or adjusted under 35 U.S.C. 154(b) by 0 days.

(21) Appl. No.: 19/230,140

(22) Filed: Jun. 6, 2025

(51) Int. Cl.
| | |
|---|---|
| *F21V 21/30* | (2006.01) |
| *A01M 29/10* | (2011.01) |
| *F21V 21/08* | (2006.01) |
| *F21V 33/00* | (2006.01) |

(52) U.S. Cl.
CPC ............. *F21V 21/30* (2013.01); *A01M 29/10* (2013.01); *F21V 21/0824* (2013.01); *F21V 33/006* (2013.01)

(58) Field of Classification Search
CPC .... A01M 29/10; F21V 21/0824; F21V 21/30; F21V 33/006
See application file for complete search history.

(56) References Cited

U.S. PATENT DOCUMENTS 10,386,048 B2 * 8/2019 Enck, Sr. ................ E04H 12/22
10,823,377 B1 * 11/2020 Hsu .......................... F21V 19/02

* cited by examiner

*Primary Examiner* — Jason M Han
(74) *Attorney, Agent, or Firm* — HOWARD M COHN and Associates, LLC

(57) ABSTRACT

Disclosed is a projection lamp with a rodent repulsion effect, including a ground insert component. A bottom of a support platform is inserted into an upper portion of the ground insert component. A top of the support platform is fixedly connected with a support base. One end of a driving component is inserted into an upper portion of the support base. An integrated emission block is installed inside a lower portion of the support base. The support platform is installed above the ground insert component, a plug portion is inserted into a slot portion for rotational connection, the support base is arranged above the support platform, a ball head portion is inserted into a threaded clamping head portion, and an outer portion of the threaded clamping head portion is fixed through a locking nut. The support platform can rotate, and the projection lamp component can rotate by 360 degrees.

8 Claims, 3 Drawing Sheets

PROJECTION LAMP WITH RODENT REPULSION EFFECT

TECHNICAL FIELD

The utility model relates to the technical field of projection lamps, and in particular to a projection lamp with a rodent repulsion effect.

BACKGROUND

Rodents are a common type of rodent in our daily lives. They live around our houses, dig holes to make nests, damage furniture and green plants in yards, and spread diseases. To cope with the destruction caused by the rodents, people generally use rodent repellers to drive them away. Currently, there are many methods for rodent repulsion, and projection lamps exhibit well in rodent repulsion applications. However, when existing projection lamps are installed in farmland, due to a large area of a farmland, the projection lamps are usually fixed, and when illuminating, the projection lamps either illuminate horizontally or need to be inserted into the ground at an angle, which is highly inconvenient to operate and reduces a rodent repulsion effect. Therefore, a projection lamp with a rodent repulsion effect is provided for the above problems.

SUMMARY

An objective of the utility model is to provide a projection lamp with a rodent repulsion effect to solve the problems proposed in the above background.

In order to solve the above technical problems, the utility model specifically provides the following technical solution: A projection lamp with a rodent repulsion effect includes a ground insert component. A bottom of a support platform is inserted into an upper portion of the ground insert component, and a top of the support platform is fixedly connected with a support base. One end of a driving component is inserted into an upper portion of the support base, and an integrated emission block is installed inside a lower portion of the support base. A ball head portion is arranged above the support base, and the ball head portion is inserted and rotationally connected inside a lower portion of a projection lamp component, meanwhile the ball head portion and an exterior of the lower portion of the projection lamp component are sleeved with a locking nut, a light transmitting component is clamped and fixedly connected into a front surface of an upper portion of the projection lamp component, and a connecting wire set is arranged between the lower portion of the projection lamp component and a back surface end of the driving component.

Preferably, a slot portion is formed in the upper portion of the ground insert component, and a plug portion is arranged below the support platform, and meanwhile the plug portion is inserted into the slot portion for rotational connection.

Preferably, a component storage chamber portion is arranged above the support platform, and an internal space is jointly formed in the support platform and the component storage chamber portion.

Preferably, a signal device is arranged at one end of the driving component, and the signal device penetrates out of a middle portion of the component storage chamber portion.

Preferably, an upper portion of the integrated emission block is fixedly connected with a lower portion of a limiting rib, and the lower portion of the limiting rib is in a cross shape.

Preferably, two rib rods above a limiting rib are both attached to an inner wall of the internal space, and the integrated emission block is positioned below the signal device with a distance therebetween.

Preferably, a threaded clamping head portion is arranged on one side below the projection lamp component, and the ball head portion is inserted and rotationally connected into the threaded clamping head portion.

Preferably, the threaded clamping head portion is externally sleeved and fixedly connected with the locking nut, and a lower portion of the locking nut penetrates out of a lower end of the ball head portion.

Compared with the Prior Art, the Utility Model has the Following Beneficial Effects:

According to the utility model, the support platform is installed above the ground insert component, and the plug portion arranged below the support platform is inserted into the slot portion in the upper portion of the ground insert component for rotational connection, the support base is arranged above the support platform, and the ball head portion arranged above the support base is inserted into the threaded clamping head portion below the projection lamp component, and meanwhile, an outer portion of the threaded clamping head portion is fixed through the locking nut. The support platform above the ground insert component can rotate, and the projection lamp component can rotate by 360 degrees on an upper portion of the support base, such that the projection lamp can illuminate in a targeted manner during work, and avoids a situation of horizontal illumination. Meanwhile, there is no need for an obliquely inserted structure to align an illumination direction, making an operation simple and enhancing the rodent repulsion effect.

BRIEF DESCRIPTION OF FIGURES

To describe the technical solutions in implementations of the utility model or the prior art more clearly, the accompanying drawings required for describing the implementations or the prior art will be briefly described below. Apparently, the accompanying drawings in the following description are merely exemplary. Those of ordinary skill in the art may also derive other implementation accompanying drawings according to the provided accompanying drawings without creative labor.

Figure 1:
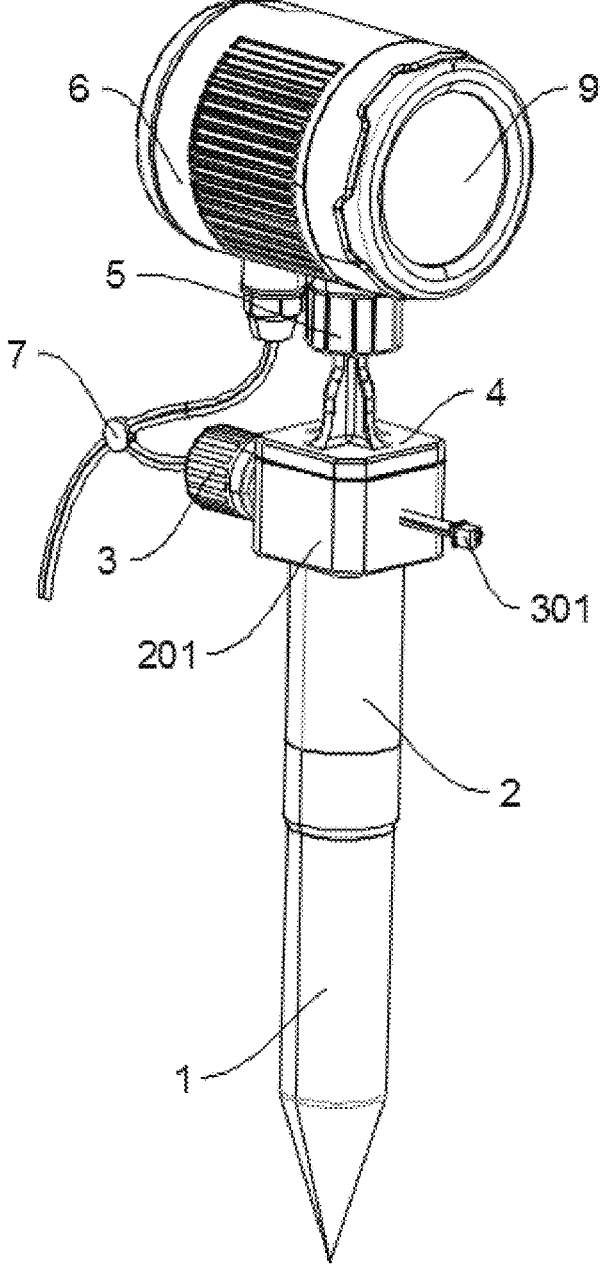
FIG. 1 is an overall schematic diagram of the utility model.

REFERENCE NUMERALS IN THE ACCOMPANYING DRAWINGS REPRESENT THE FOLLOWING RESPECTIVELY

1—ground insert component; 101—slot portion; 2—support platform; 201—component storage chamber portion; 202—internal space; 203—plug portion; 3—driving component; 301—signal device; 4—support base; 401—ball head portion; 5—locking nut; 6—projection lamp component; 601—threaded clamping head portion; 7—connecting wire set; 8—integrated emission block; 801—limiting rib; and 9—light transmitting component.

DETAILED DESCRIPTION

The technical solutions in embodiments of the utility model will be described clearly and completely hereinafter with reference to the accompanying drawings in the embodiments of the utility model. Apparently, the described embodiments are only a part rather than all of the embodiments of the utility model. Based on the embodiments of the utility model, all other embodiments obtained by those of ordinary skill in the art without making creative efforts shall fall within the protection scope of the utility model.

Figure 2:
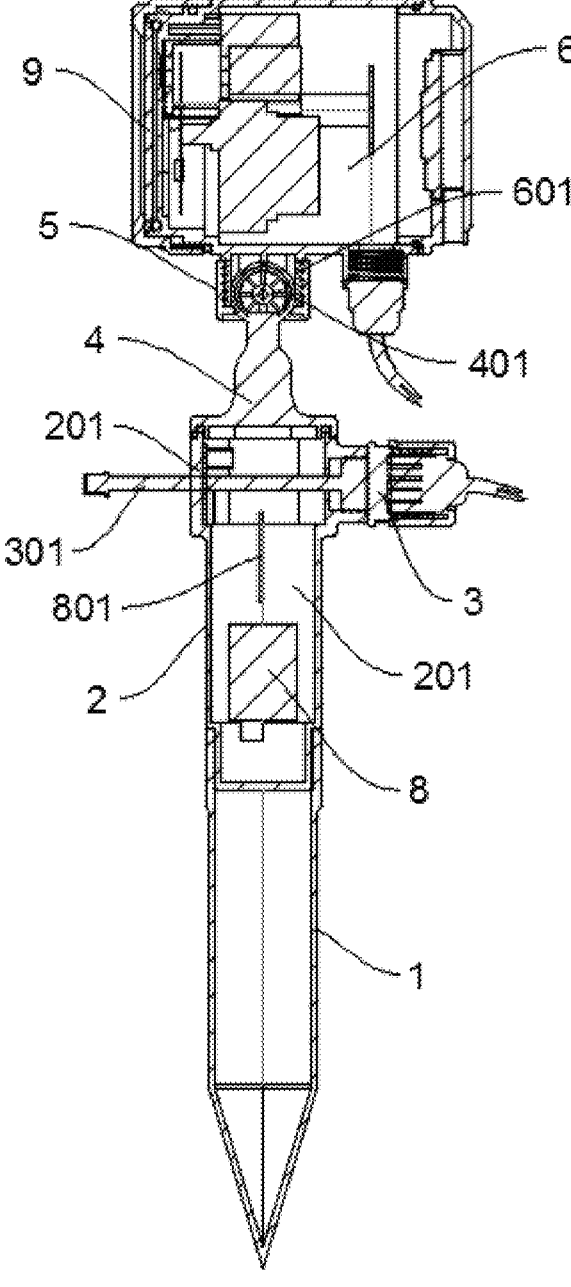
FIG. 2 is an overall sectional schematic diagram of the utility model.
Figure 3:
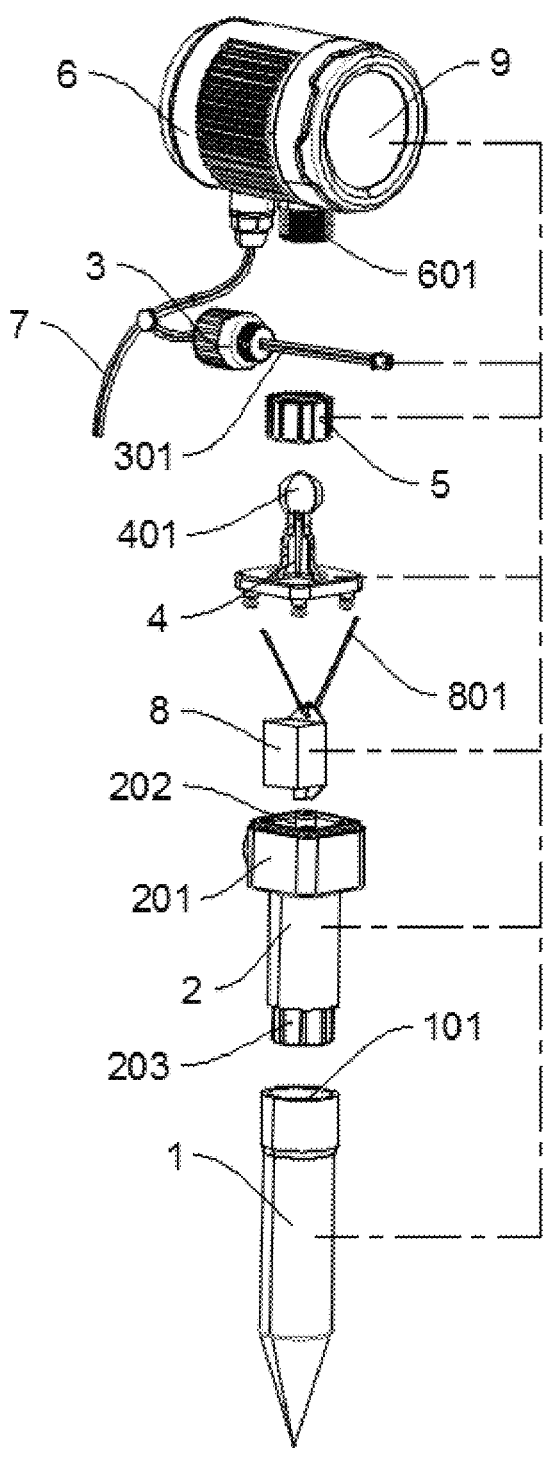
FIG. 3 is an overall exploded schematic diagram of the utility model.

Referring to FIG. 1 to FIG. 3, the utility model provides a projection lamp with a rodent repulsion effect, including a ground insert component 1. A bottom of a support platform 2 is inserted into an upper portion of the ground insert component 1, and a top of the support platform 2 is fixedly connected with a support base 4. One end of a driving component 3 is inserted into an upper portion of the support base 4, and an integrated emission block 8 is installed inside a lower portion of the support base 4. A ball head portion 401 is arranged above the support base 4, and the ball head portion 401 is inserted and rotationally connected inside a lower portion of a projection lamp component 6, meanwhile, the ball head portion 401 and an exterior of the lower portion of the projection lamp component 6 are sleeved with a locking nut 5, a light transmitting component 9 is clamped and fixedly connected into a front surface of an upper portion of the projection lamp component 6, and a connecting wire set 7 is arranged between the lower portion of the projection lamp component 6 and a back surface end of the driving component 3.

In this implementation, a slot portion 101 is formed in the upper portion of the ground insert component 1, and a plug portion 203 is arranged below the support platform 2, and meanwhile the plug portion 203 is inserted into the slot portion 101 for rotational connection.

After the support platform 2 is installed above the ground insert component 1, since the support platform and the ground insert component are rotationally connected, the support platform 2 and structures above the support platform can be adjusted in direction through rotation.

Further, a component storage chamber portion 201 is arranged above the support platform 2, and an internal space 202 is jointly formed in the support platform 2 and the component storage chamber portion 201.

Further, a signal device 301 is arranged at one end of the driving component 3, and the signal device 301 penetrates out of a middle portion of the component storage chamber portion 201.

Further, an upper portion of the integrated emission block 8 is fixedly connected with a lower portion of a limiting rib 801, and the lower portion of the limiting rib 801 is in a cross shape.

Further, two rib rods above the limiting rib 801 are both attached to an inner wall of the internal space 202, and the integrated emission block 8 is positioned below the signal device 301 with a distance therebetween.

The integrated emission block 8 is installed in the support platform 2 to transmit instructions to the driving component 3, which are received by the signal device 301 of the driving component 3, meanwhile, the connecting wire set 7 is arranged between a rear end of the driving component 3 and the lower portion of the projection lamp component 6, and the projection lamp component 6 works using the driving component 3.

In this implementation, a threaded clamping head portion 601 is arranged on one side below the projection lamp component 6, and the ball head portion 401 is inserted and rotationally connected into the threaded clamping head portion 601.

Further, the threaded clamping head portion 601 is externally sleeved and fixedly connected with the locking nut 5, and a lower portion of the locking nut 5 penetrates out of a lower end of the ball head portion 401.

The ball head portion 401 is inserted into the threaded clamping head portion 601 below the projection lamp component 6 and then is fixed through the locking nut 5, such that the ball head portion 401 can rotate in the threaded clamping head portion 601. Accordingly, through the ball head portion 401, a direction of the projection lamp component 6 can be rotated, and a lamp illumination direction can be adjusted.

Operational Principle:

The support platform 2 is installed above the ground insert component 1, and the plug portion 203 arranged below the support platform 2 is inserted into the slot portion 101 in the upper portion of the ground insert component 1 for rotational connection, such that the support platform 2 and the structures above the support platform 2 can rotate above the ground insert component 1. The support base 4 is arranged above the support platform 2, and the ball head portion 401 arranged above the support base 4 is inserted into the threaded clamping head portion 601 below the projection lamp component 6, meanwhile, an outer portion of the threaded clamping head portion 601 is fixed through the locking nut 5, and since the ball head portion 401 can rotate in the threaded clamping head portion 601, the projection lamp component 6 can rotate by 360 degrees through the ball head portion 401, and the light transmitting component 9 arranged on the front surface of the projection lamp component 6 can illuminate upwards or downwards, and by combining the rotatability of the support platform 2 and the 360-degree rotation of the projection lamp component 6, the projection lamp component 6 can perform all-around illumination work.

In the description of the specification, references to terms such as "an embodiment", "an example", and "a specific example" indicate that specific features, structures, materials, or characteristics described in connection with the embodiment or the example are included in at least one embodiment or example of the utility model. In the specification, the schematic representations of the above terms are not necessarily intended to refer to the same embodiment or example. In addition, the described specific features, structures, materials, or characteristics may be combined in a proper manner in any one or more of the embodiments or examples.

The above embodiments are merely exemplary embodiments of this application, and are not intended to limit this application. The protection scope of this application is defined by the claims. Those skilled in the art may make various modifications or equivalent substitutions to this application within the essence and protection scope of this application, and such modifications or equivalent substitutions shall also be deemed to fall within the protection scope of this application.

What is claimed is:

1. A projection lamp with a rodent repulsion effect, comprising a ground insert component (1), wherein a bottom of a support platform (2) is inserted into an upper portion of the ground insert component (1), and a top of the support platform (2) is fixedly connected with a support base (4), one end of a driving component (3) is inserted into an upper portion of the support base (4), and an integrated emission block (8) is installed inside a lower portion of the support base (4), a ball head portion (401) is arranged above the support base (4), and the ball head portion (401) is inserted and rotationally connected inside a lower portion of a projection lamp component (6), meanwhile, the ball head portion (401) and an exterior of the lower portion of the projection lamp component (6) are sleeved with a locking nut (5), a light transmitting component (9) is clamped and fixedly connected into a front surface of an upper portion of the projection lamp component (6), and a connecting wire set (7) is arranged between the lower portion of the projection lamp component (6) and a back surface end of the driving component (3).

2. The projection lamp with a rodent repulsion effect according to claim 1, wherein a slot portion (101) is formed in the upper portion of the ground insert component (1), and a plug portion (203) is arranged below the support platform (2), and meanwhile the plug portion (203) is inserted into the slot portion (101) for rotational connection.

3. The projection lamp with a rodent repulsion effect according to claim 2, wherein a component storage chamber portion (201) is arranged above the support platform (2), and an internal space (202) is jointly formed in the support platform (2) and the component storage chamber portion (201).

4. The projection lamp with a rodent repulsion effect according to claim 3, wherein a signal device (301) is arranged at one end of the driving component (3), and the signal device (301) penetrates out of a middle portion of the component storage chamber portion (201).

5. The projection lamp with a rodent repulsion effect according to claim 4, wherein an upper portion of the integrated emission block (8) is fixedly connected with a lower portion of a limiting rib (801), and the lower portion of the limiting rib (801) is in a cross shape.

6. The projection lamp with a rodent repulsion effect according to claim 4, wherein two rib rods above a limiting rib (801) are both attached to an inner wall of the internal space (202), and the integrated emission block (8) is positioned below the signal device (301) with a distance therebetween.

7. The projection lamp with a rodent repulsion effect according to claim 1, wherein a threaded clamping head portion (601) is arranged on one side below the projection lamp component (6), and the ball head portion (401) is inserted and rotationally connected into the threaded clamping head portion (601).

8. The projection lamp with a rodent repulsion effect according to claim 7, wherein the threaded clamping head portion (601) is externally sleeved and fixedly connected with the locking nut (5), and a lower portion of the locking nut (5) penetrates out of a lower end of the ball head portion (401).

* * * * *